(12) United States Patent
Firestone

(10) Patent No.: US 9,224,006 B1
(45) Date of Patent: Dec. 29, 2015

(54) SYSTEM AND METHOD OF SECURE DATA ACCESS

(71) Applicant: KGSS, Inc., Arlington, VA (US)

(72) Inventor: Adam C. Firestone, Arlington, VA (US)

(73) Assignee: KGSS, Inc., Arlington, VA (US)

( * ) Notice: Subject to any disclaimer, the term of this patent is extended or adjusted under 35 U.S.C. 154(b) by 0 days.

(21) Appl. No.: 14/811,996

(22) Filed: Jul. 29, 2015

(51) Int. Cl.
*G06F 21/62* (2013.01)
*G06F 21/31* (2013.01)

(52) U.S. Cl.
CPC ............ *G06F 21/6227* (2013.01); *G06F 21/31* (2013.01)

(58) Field of Classification Search
CPC .................................................. G06F 21/6227
USPC .......................................................... 726/28
See application file for complete search history.

*Primary Examiner* — Jacob Lipman
(74) *Attorney, Agent, or Firm* — Arent Fox LLP; Michael Fainberg

(57) ABSTRACT

Disclosed are systems, methods and a computer readable medium for providing multi-level data access security. An example method includes performing an analysis of hardware and software of a user's computer system in order to mitigate the risk of unauthorized data access; receiving a user's request for data access from an application on the user's computer system, wherein the request contains a query for retrieving data; modifying the user's request for data access for possible risk mitigation based on results of the hardware and software analysis; authenticating a user sending the request for data access and redirecting the request for data access in case of successful authentication; identifying user's clearance level; retrieving query result from data storage based on user's clearance level and user's query; applying access control policies to query result for modifying query result in order to exclude from query result information requiring suppression; and transmitting final query result to the user's computer system.

17 Claims, 3 Drawing Sheets

SYSTEM AND METHOD OF SECURE DATA ACCESS

TECHNICAL FIELD

The present disclosure relates generally to the field of information security, and in particular, to a system and method of secure data access.

BACKGROUND

The volume of information used by people is constantly increasing. By 2019, global consumer IP traffic is expected to reach 138,410 petabytes per month at a 24 percent compound annual growth rate. This information can include different documents, articles, reference information and so on. In order to store these types of information, different data storage mechanisms are used, including relational and non-relational databases. Along with the need to store huge volumes of data comes the necessity of protecting this data from unauthorized access.

The problem of information security is especially important for organizations working with classified information. For example, the defense industry requires augmented security measures to ensure that classified information used with respect to systems produced for government customers cannot be accessed by unauthorized persons. For a data storage solution a relational database system is usually provided, whereby for each information security level ("confidential", "secret" and top "secret") a separate database is provided. Thereby, the matter of access to data by a person consists of access to one of a plurality of databases by a given person. Meanwhile database access control is provided by means of the present database management systems (DBMS).

However, the previously mentioned approach concerning database access control has several drawbacks. A plurality of databases used to store different security level information can often store duplicated data (copies of the same data, stored in different databases). Generally storing excess data is unprofitable; it is one drawback of the previously mentioned approach.

SUMMARY

Disclosed are various aspects of systems, methods and computer program products for providing multi-level data access security. One technical result of the disclosed aspects is the mitigation of possible risks that an enterprise's information may be accessed, stolen and/or used by criminals.

In one aspect, an example method for providing multi-level data access security, includes performing an analysis of hardware and software of a user's computer system in order to mitigate the risk of unauthorized data access; receiving a user's request for data access from an application on the user's computer system, wherein the request contains a query for retrieving data; modifying the user's request for data access for possible risk mitigation based on results of the hardware and software analysis; authenticating a user sending the request for data access and redirecting the request for data access in case of successful authentication; identifying user's clearance level; retrieving query result from data storage based on user's clearance level and user's query; applying access control policies to query result for modifying query result in order to exclude from query result information requiring suppression; and transmitting final query result to the user's computer system.

In another aspect, software analysis includes vulnerability detection with respect to the applications present within the user's computer system.

In another aspect, hardware analysis includes vulnerability detection with respect to the devices of the user's computer system.

In another aspect, hardware analysis includes detection with respect to untrusted data storage mechanisms.

In another aspect, hardware analysis includes vulnerability detection with respect to network hardware used for communication.

In another aspect, modifying user's request includes an exclusion from the query of reserved value names.

In another aspect, an example system for providing multi-level data access security, the system comprising a processor, configured to perform an analysis of hardware and software of a user's computer system in order to mitigate the risk of unauthorized data access; receive a user's request for data access from an application on the user's computer system, where request contains a query for retrieving data; modify user's request for data access for possible risk mitigation based on hardware, software analysis results; authenticate a user sending the request for data access and redirect the request for data access in case of successful authentication; identify user's clearance level; retrieve query result from data storage based on user's clearance level and user's query; apply access control policies to query result for modifying query result in order to exclude from query result information requiring suppression; and transmit final query result to user's computer system.

In a further aspect, a non-transitory computer-readable storage medium storing computer program product comprising computer-executable instructions for providing multi-level data access security, including instructions for performing an analysis of hardware and software of a user's computer system in order to mitigate the risk of unauthorized data access; receiving a user's request for data access from an application on the user's computer system, wherein the request contains a query for retrieving data; modifying the user's request for data access for possible risk mitigation based on results of the hardware and software analysis; authenticating a user sending the request for data access and redirecting the request for data access in case of successful authentication; identifying user's clearance level; retrieving query result from data storage based on user's clearance level and user's query; applying access control policies to query result for modifying query result in order to exclude from query result information requiring suppression; and transmitting final query result to the user's computer system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows.

BRIEF DESCRIPTION OF THE DRAWINGS

For a better understanding of the disclosed aspects, reference should be made to the Description of Aspects below, in conjunction with the following drawings in which like reference numerals refer to corresponding parts throughout the figures.

DETAILED DESCRIPTION

Example aspects are described herein in the context of a system, method, and computer program product for secure data access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Various aspects of the disclosed systems, methods and computer program products can be implemented as part of a computer system. The computer system can be one physical machine, or can be distributed among multiple physical machines, such as by role or function, or by process thread in the case of a cloud computing distributed model. In various aspects, the disclosed systems, methods and computer program products can be configured to run in virtual machines (e.g., system virtual machines, operating system-level virtual machines, process virtual machines, or any combination thereof) that in turn are executed on one or more physical machines. It will be understood by persons of skill in the art that features of the invention may be realized by a variety of different suitable machine implementations.

Figure 1:
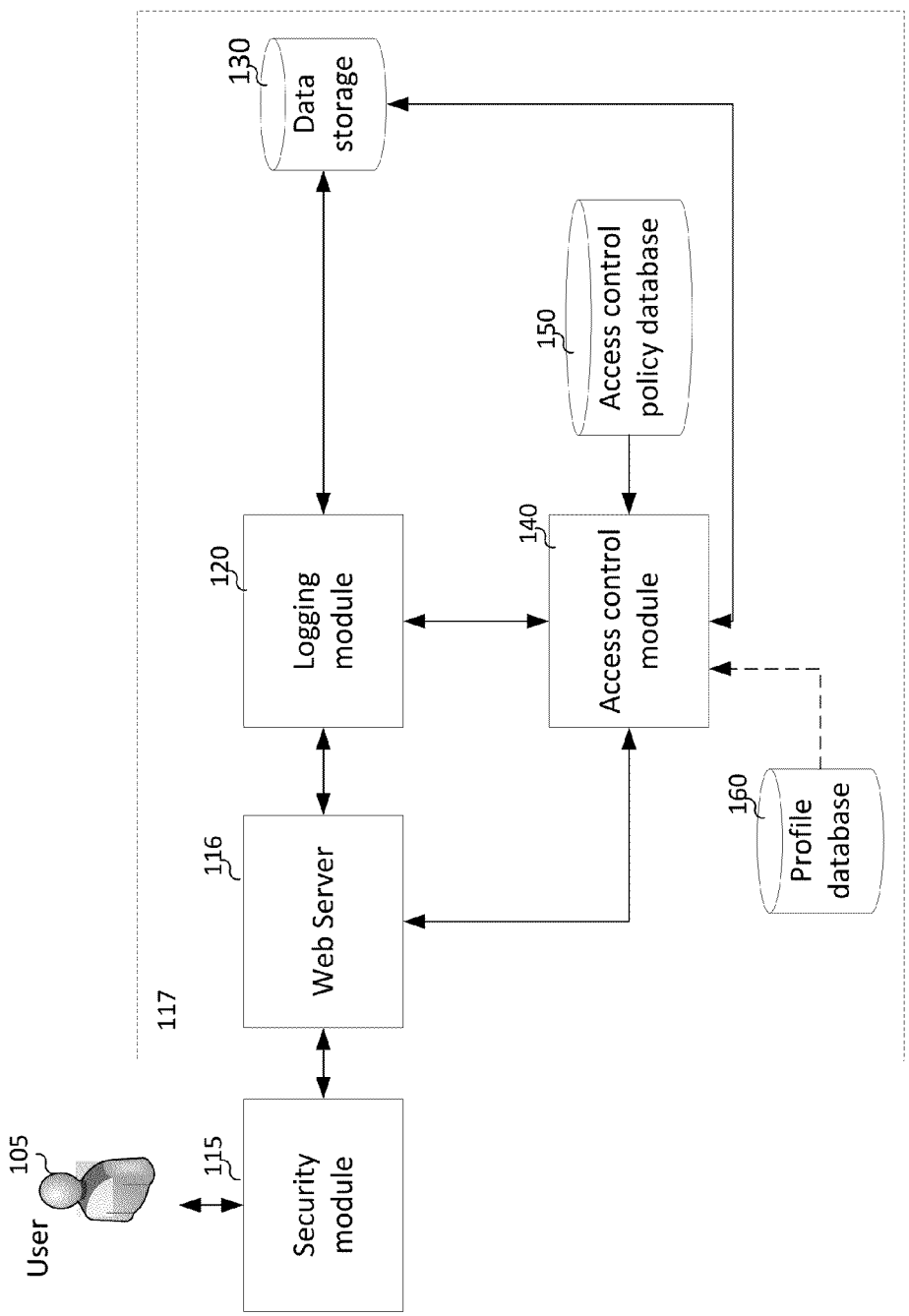
FIG. 1 is a block diagram illustrating a system of secure data access, in accordance with some aspects.

FIG. 1 is a block diagram illustrating an example system of secure data access. Enterprise infrastructure 117 may include a combination of hardware and software components for secure access to the data stored within said infrastructure 117. Data storage 130 is used to store various types of information including information of different security levels, for example "top secret", "secret", "confidential" and "unclassified". These security levels reflect the importance of the stored data being revealed to someone who is authorized to get access to the corresponding security level of the data. In one example, user is authorized to get access to information of a particular security level (for example "top secret") is also authorized to get access to data with a lower security level (for example "secret", "confidential" and "unclassified"). The data storage 130 may include a database configured to execute queries, received from user 105, and modifying the query results according to the user's 105 clearance level. The data storage 130 is also configured to request a user's 105 clearance level from access control module 140. According to one aspect, data storage 130 may include an Apache Accumulo database having a cell-level security feature used for flexible access policy usage. Data storage 130 is connected to a logging module 120 and access control module 140.

In order to get a certain type of information, user 105 makes a corresponding request (query) to the data storage 130 with the help of user's 105 computer system (by means of web-browser or specialized application). In one example aspect, the user 105 is located outside the enterprise infrastructure 117. In fact user's query goes through a number of processing operations (which will be described further below) before it reaches the data storage 130. According to one aspect, user's 105 query includes user's 105 identification credentials such as username and password or a digital certificate paired with a password.

The first step of the processing of the user's 105 query is performed by the security module 115. Detailed description of its implementation will be given below. After security module 115 processing the query reaches enterprise infrastructure 117 and namely, web server 116.

In one example aspect, the web server 116 serves as the primary means of interaction between user 105 and data storage 130. The web server can be implemented by means of the Apache Tomcat Server. The web server 116 is configured to redirect user's abovementioned identification credentials and to an access control module 140. According to one aspect, the web server 116 redirects the whole query including the identification credentials to the access control module 140. The web server 116 is also capable of sending the user's 105 query to a logging module 120 for further redirecting to the data storage 130 and of transmission query results received from the logging module 120 to the user 105.

In one example aspect, the access control module 140 provides authentication, authorization and user management functionality. The access control module 140 receives user's 105 identification credentials (or extracts from the received query) and compares it with stored credentials of all known users. According to one aspect, known users identification credentials are stored in a profile database 160. Depending on the result of the user's authentication, further query processing can be permitted or not. The access control module is capable of transmitting information concerning user's 105 clearance level by the request of the data storage 130. The access control module 140 is also configured to apply access control policies stored in access control policy database 150 to the query results received from the logging module 120. In one example aspect, the access control module 140 can be implemented by the means of WSO2 Identity Server, meanwhile the access control policy database 150 can be implemented by the means of WSO2 Governance Registry.

If the query processing was permitted by the access control module 120 the user's 105 query is transmitted from the web server 116 to the logging module 120. The logging module 120 provides logging, auditing all the data and security transactions and the ability to alert administrators and security managers of any anomalous or insecure activity. The logging module is configured to send the user's 105 query to the data storage 130. The logging module is also configured to transmit the query results to the access control module 140 for further access policy application. Modified user's 105 query results are sent by the logging module 120 and back to the user 105. The logging module 120 also acts as an Enterprise Server Bus (ESB), which provides data transport. The logging module 120 can be implemented by the combination of existing solutions, such as the WOS2 ESB and WSO2 Business Activity Monitor.

Security module 115 is configured to analyze user's 105 environment in order to detect software and hardware vulnerabilities and to modify user's 105 queries to the data storage 130 according to the vulnerabilities detection results, wherein the data storage 130 is a part of enterprise infrastructure 117. The aim of the analysis is to determine a vulnerability rating, representing according to one aspect a number from 0 to 100. The higher the vulnerability rating, the higher the possibility of user being a victim of a cyber attack, and the higher the risk of information stored in data storage 130 being accessed and/or stolen by criminals. Software and hardware (including removable data storage and network hardware) of the user's 105 computer system are analyzed for determining the vulnerability rating.

During the software analysis, security module 115 scans software present within user's 105 computer system and compares it with a list of known vulnerabilities for different application versions. In one example, a database containing a list of known vulnerabilities which is periodically updated with information about new versions of applications and its known vulnerabilities is used to detect user's 105 software vulnerabilities. The result of software analysis is a software vulnerability rating, a number from 0 to 100 according to one aspect, the higher the software vulnerability rating the more known software vulnerabilities present on user's 105 computer system. In one exemplary aspect, the following equation may be used to calculate software vulnerability rating, wherein X is a total number of known application vulnerabilities within user's 105 computer system:

$$100 * \sqrt{\frac{2 * \tan^{-1}(x)}{\pi}}$$

During the hardware analysis, security module 115 scans hardware present within user's 105 computer system as well as network hardware used for communication with data storage 130 (routers, hubs, etc.) and compares it with a list of known vulnerabilities for different devices. In one exemplary aspect, a database containing a list of known vulnerabilities which is periodically updated with information about new versions of known hardware vulnerabilities is used to detect user's 105 hardware vulnerabilities. The result of software analysis is a hardware vulnerability rating, a number from 0 to 100 according to one aspect, the higher the hardware vulnerability rating the more known hardware vulnerabilities present on user's 105 computer system or network communication infrastructure. In one exemplary aspect, untrusted data storage mechanisms are considered to be vulnerable hardware. These untrusted data storage mechanisms (for example a flash drive or external hard drive) can be detected by comparing its serial numbers with the list of serial numbers of trusted data storages. The list of serial numbers of trusted data storage mechanisms can be stored in a database within the security module 115. In one exemplary aspect, the formula used to calculate software vulnerability rating is the same as the formula for calculating the software vulnerability rating, wherein X is the total number of known hardware vulnerabilities within user's 105 computer system and network infrastructure used for communication with the data storage 130.

The resulting vulnerability rating calculation is based on earlier determined software and hardware ratings. In one exemplary aspect, vulnerability rating is an arithmetic mean of the hardware and software vulnerability ratings. In another exemplary aspect, vulnerability rating is a quadratic mean of the hardware and software vulnerability ratings. In another exemplary aspect, the vulnerability rating is another power mean of the hardware and software vulnerability ratings.

The security module 115 is also configured to intercept user's 105 query to the data storage 130. The security module 115 is capable of performing heuristic-based actions depending on the information contained in the query to the data storage 130, for example the security module 115 can inform user's 105 supervisor about query processing, require additional authentication for query transmission to the data storage 130, modify the query itself and even prohibit the query transmission for possible risk mitigation. The security module 115 extracts from the intercepted query information concerning data that should be received from the data storage 130, for example in case of a SQL-based query the security module extracts value names of the supposed query result. In another exemplary aspect, the security module 115 determines locations of the user's 105 computer system and data storage 130 or the whole enterprise infrastructure 117 by analyzing the IP-addresses of the source of the query request (user's 105 computer system) and the destination IP-address in order to avoid possible legal infringements caused by classified data being illegally transmitted from one country to another. The security module's 115 operational logic (referring to the user's 105 query) is implemented with the help of the set of heuristic rules that put into compliance various actions to certain conditions. Here are some examples of the heuristic rules used by the security module 115:

- if the vulnerability rating is higher than 60, the security module excludes the query requesting the classified data;
- if the vulnerability rating is higher than 80, the security module 115 prohibits user's 105 interaction with data storage 130;
- if the user 105 and the data storage 130 are located in countries, between which classified data transmission is prohibited, the security module 115 prohibits the user's 105 queries to the data storage 130;
- if abnormal user 105 activity is detected, the security module 115 notifies user's 105 supervisor;
- if the vulnerability rating is higher than 20 and abnormal user activity is detected, the security module 115 requires additional authentication for the query to be allowed to be sent to the data storage 130;

The classified data is data corresponding to reserved data storage 130 field names. Said reserved data storage value names can be stored within the security module 115. In one exemplary aspect, the classified data is information stored in the data storage 130 and marked as "top secret", "secret" or "confidential" according to the abovementioned data classification. A list of countries, between which classified data transmission is prohibited, can be stored within the security module 115 as well and can include such countries as the USA, North Korea, Israel, Iraq and so on. Information concerning user's 105 supervisors can be also stored within the security module 115, while such information is used for communication with a supervisor (for example via email) in the abovementioned cases described within heuristic rule examples. User's 105 abnormal activity is an atypical query. The security module 115 can identify such a query by comparing earlier user 105 queries (requested value names) with the current query. According to one aspect, abnormal activity is a query for classified data, if there were no classified data queries within the past 6 months.

In one exemplary aspect, if the security module 115 prohibits query for some data, the security module 115 modifies a corresponding query, for example value names are excluded from the query if they correspond to classified data (abovementioned reserved value names).

The query to the data storage 130, which can be also modified by the security module 115 by one of the abovementioned methods, is further transmitted to the enterprise infrastructure 117 and web server 116 in particular along with extracted information about user's location.

Figure 2:
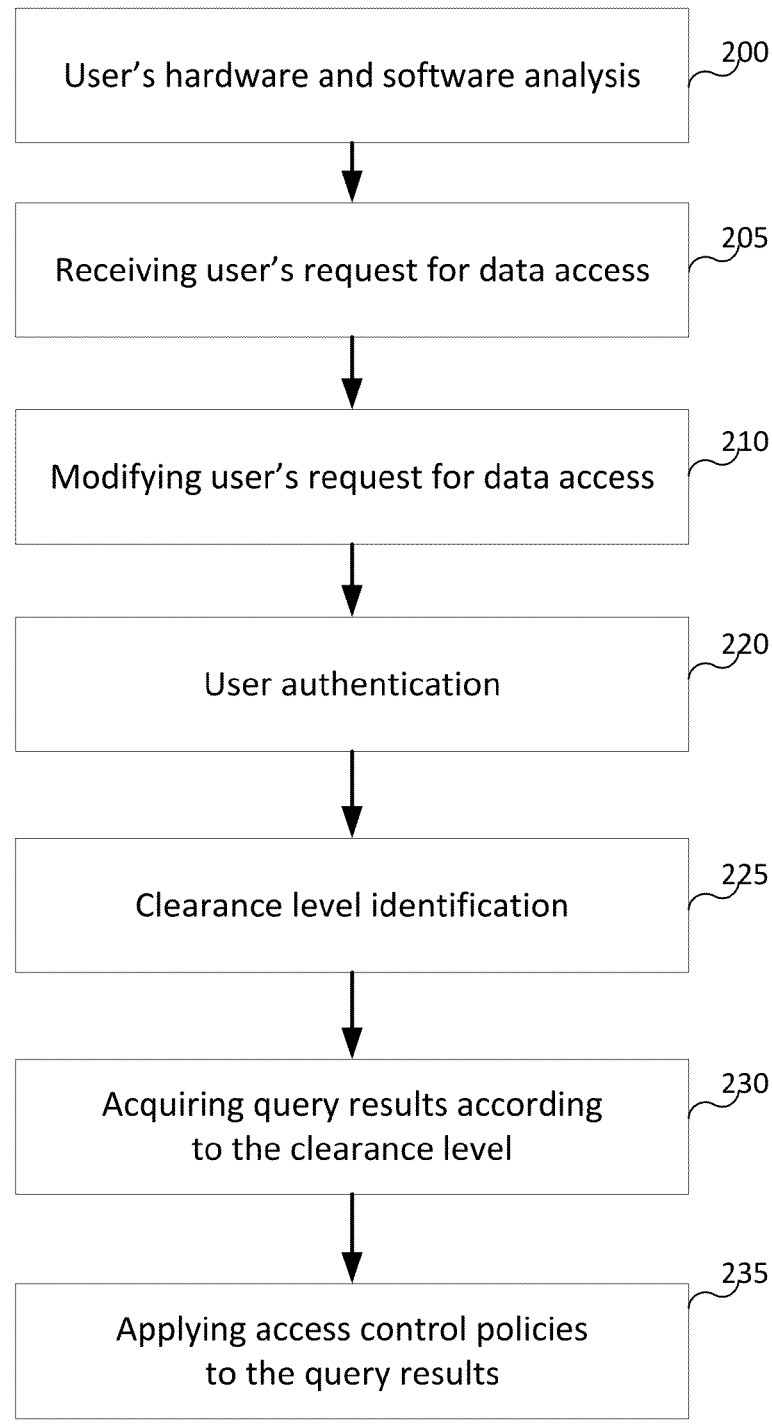
FIG. 2 is a flow chart illustrating a method of secure data access, in accordance with some aspects.

FIG. 2 shows a flow chart illustrating an example method of secure data access. In step 200, the security module 115 provides user's 105 software and hardware analysis calculating the vulnerability rating. In step 205, the security module receives the user's 105 request for data access by intercepting the user's 105 query to the data storage 130. In step 210, the security module 115 modifies user's 105 request (query to the data storage 130) for data access. All the actions made by the security module 115 such as query modification, supervisor notification and so on are performed according to the set of heuristic rules used by the said module 115. The modified user's query is transmitted by the security module 115 to the enterprise infrastructure 117. Upon arrival at the web server 116, the query, including identification credentials, is redirected to the access control module 140 for further authentication. In step 220, the user 105 authentication is provided by the access control module 140. In case of successful authentication, the user's 105 query is transmitted to the data storage 130 via the logging module 120. Based on the identification credentials contained in the query the data storage 130 makes a request to the access control module 140 for the user's 105 clearance level identification. In step 225, access control module 140 provides said clearance level identification resulting in acquiring user 105 entitlement information. The entitlement information is consistent with the BLP (Bell-LaPadula) model, the user's 105 clearance level and any compartments into which the user 105 has been read. In step 230, the data storage 130 generates a query result filtering out those data values for each record from the result that are inconsistent with the user's 105 clearance level and compartments later. Filtering is the process of comparing the user's 105 clearance level and the result values classification level. Upon completion of the filtration process, the query results are sent to the logging module 120 by the data storage 130. The logging module 120 redirects query results to the access control module 140 which reviews the query results to determine what types of access control policies are applicable. Access control policies provide a more flexible attribute based access control (ABAC) than BLP model by using cell-level access control rules. Here are some examples of the access control policies:

Suppress from the set of results all the values, if the query is sent between 6 p.m. and 9 a.m.;

Suppress from the set of results values with Row ID "Nuclear reactor features" if the user's name is "John Doe";

Suppress from the set of results values with Timestamp earlier than January 2010;

Suppress from the set of results all the values, if user's IP mask is not 180.93.255.255.

According to one aspect, the query result from the data storage 130 is a set of tuples that appear as <Row ID, Column (family, qualifier, classification level), Timestamp, Value>.

After applying all the matched access control policies, the access control module 140 returns modified query results back to user 105 by transmitting the results through the logging module 120 and the web server 116.

Figure 3:
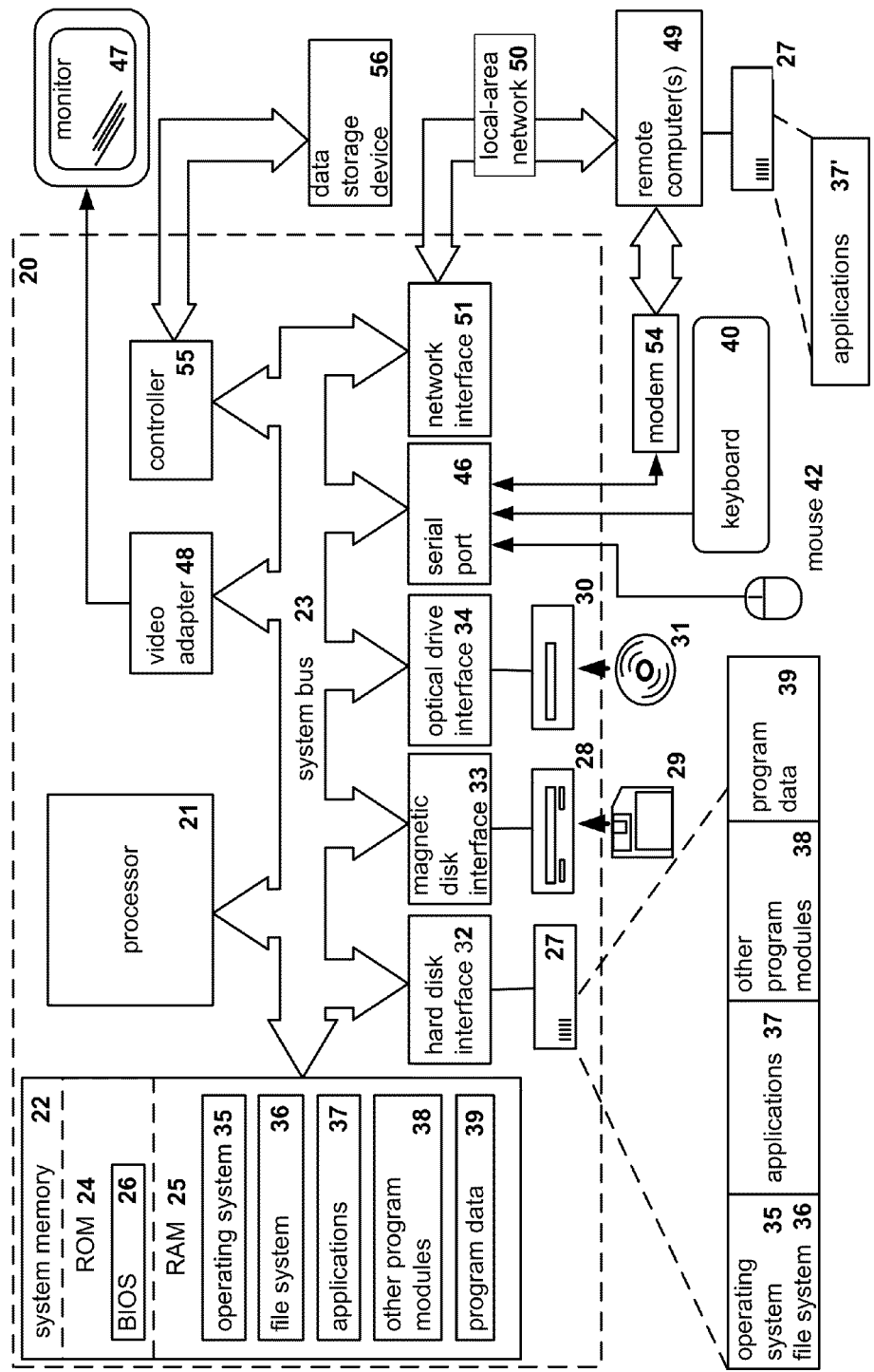
FIG. 3 is a block diagram illustrating a general-purpose computer system on which aspects of the invention can be implemented.

FIG. 3 shows an example of a general-purpose computer system (which may be a personal computer or a server) 20, which may be used to implement aspects of the system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including, in turn, a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures that can be accessed by a processor of a general purpose computer.

In various aspects, the systems and methods described in the present disclosure is in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing multi-level data access security, comprising:
   performing, by a hardware processor, an analysis of hardware and software of a user's computer system in order to mitigate the risk of unauthorized data access;
   receiving a user's request for data access from an application on the user's computer system, wherein the request contains a query for retrieving data;
   modifying the user's request for data access for possible risk mitigation based on results of the hardware and software analysis;
   authenticating a user sending the request for data access and redirecting the request for data access in case of successful authentication;
   identifying user's clearance level;
   retrieving query result from data storage based on user's clearance level and user's query;
   applying access control policies to query result for modifying query result in order to exclude from query result information requiring suppression; and
   transmitting final query result to the user's computer system.

2. The method of claim 1, wherein software analysis includes vulnerability detection of the applications present within the user's computer system.

3. The method of claim 1, wherein modifying user's request includes the exclusion from the query reserved value names.

4. The method of claim 1, wherein hardware analysis includes vulnerability detection of the devices of the user's computer system.

5. The method of claim 4, wherein hardware analysis includes detection of the untrusted data storage mechanisms.

6. The method of claim 4, wherein hardware analysis includes vulnerability detection of network hardware used for communication.

7. A system for providing multi-level data access security, the system comprising:
   a hardware processor configured to:
      perform an analysis of hardware and software of a user's computer system in order to mitigate the risk of unauthorized data access;
      receive a user's request for data access from an application on the user's computer system, where request contains a query for retrieving data;
      modify user's request for data access for possible risk mitigation based on hardware, software analysis results;
      authenticate a user sending the request for data access and redirect the request for data access in case of successful authentication;
      identify user's clearance level;
      retrieve query result from data storage based on user's clearance level and user's query;
      apply access control policies to query result for modifying query result in order to exclude from query result information requiring suppression; and
      transmit final query result to user's computer system.

8. The system of claim 7, wherein software analysis includes vulnerability detection of the applications present within the user's computer system.

9. The system of claim 7, wherein modifying user's request includes the exclusion from the query reserved value names.

10. The system of claim 7, wherein hardware analysis includes vulnerability detection of the devices of the user's computer system.

11. The system of claim 10, wherein hardware analysis includes detection of the untrusted data storage mechanisms.

12. The system of claim 10, wherein hardware analysis includes vulnerability detection of network hardware used for communication.

13. A non-transitory computer-readable storage medium comprising computer-executable instructions for providing multi-level data access security, including instructions for:
- performing an analysis of hardware and software of a user's computer system in order to mitigate the risk of unauthorized data access;
- receiving a user's request for data access from an application on the user's computer system, wherein the request contains a query for retrieving data;
- modifying the user's request for data access for possible risk mitigation based on results of the hardware and software analysis;
- authenticating a user sending the request for data access and redirecting the request for data access in case of successful authentication;
- identifying user's clearance level;
- retrieving query result from data storage based on user's clearance level and user's query;
- applying access control policies to query result for modifying query result in order to exclude from query result information requiring suppression; and
- transmitting final query result to the user's computer system.

14. The computer-readable storage medium of claim 13, wherein software analysis includes vulnerability detection of the applications present within the user's computer system.

15. The computer-readable storage medium of claim 13, wherein hardware analysis includes vulnerability detection of the devices of the user's computer system.

16. The computer-readable storage medium of claim 15, wherein hardware analysis includes detection of the untrusted data storage mechanisms.

17. The computer-readable storage medium of claim 15, wherein hardware analysis includes vulnerability detection of network hardware used for communication.

* * * * *